May 19, 1925.  1,538,573
D. F. MINNEY
ADJUSTABLE END THRUST FOR ELEVATOR SHAFTS
Filed Dec. 1, 1924      2 Sheets-Sheet 1
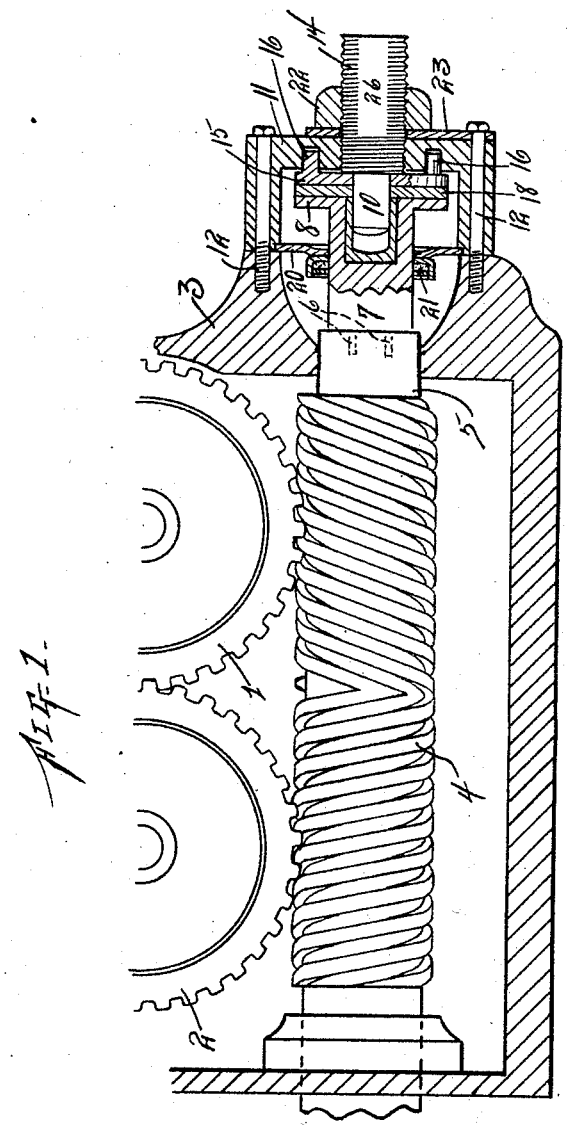
Inventor
DAVID F. MINNEY.
By A. L. Jackson
Attorney

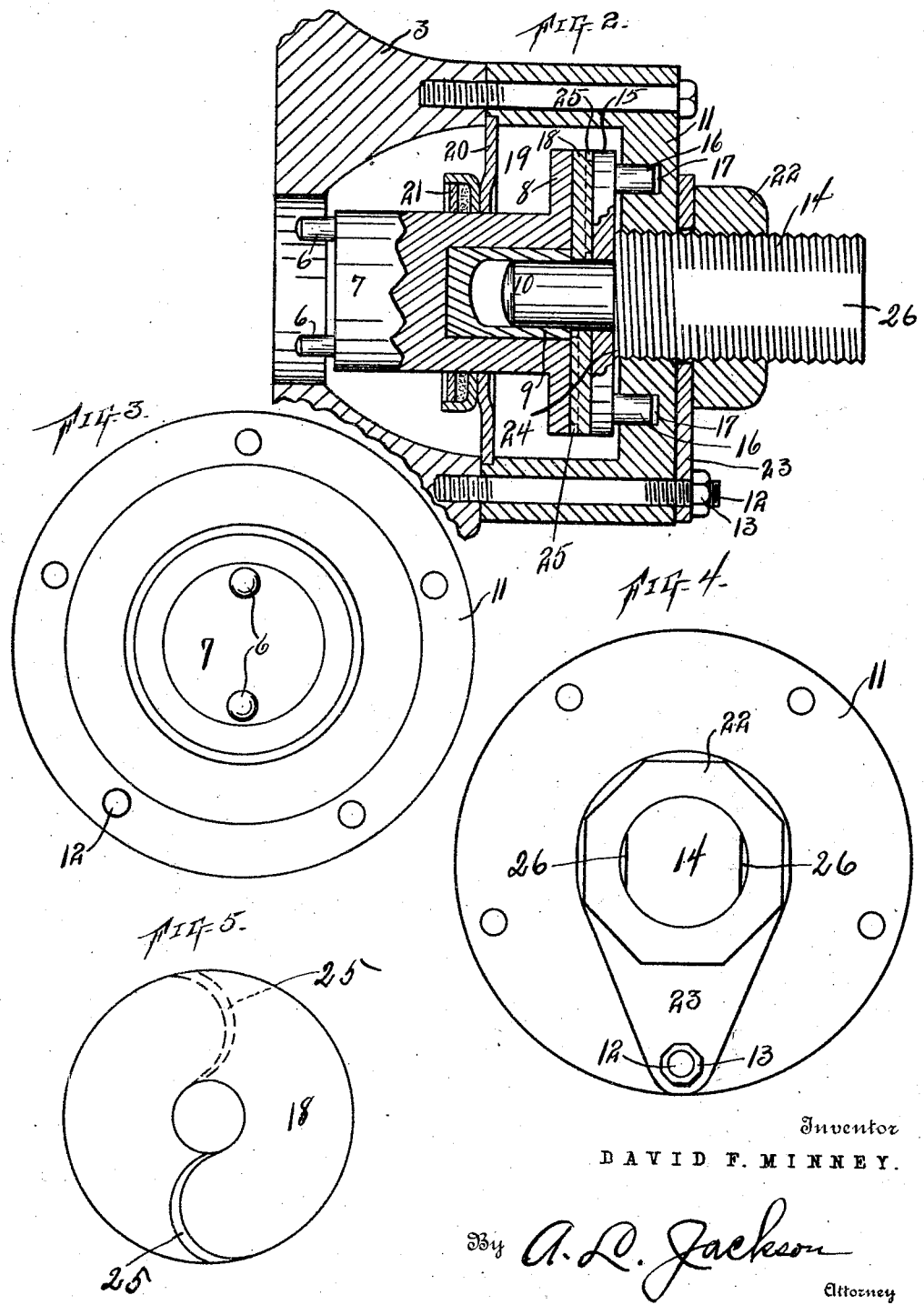

Patented May 19, 1925.

1,538,573

UNITED STATES PATENT OFFICE.

DAVID F. MINNEY, OF FORT WORTH, TEXAS, ASSIGNOR TO GLOBE ELEVATOR APPLIANCE COMPANY, OF FORT WORTH, TEXAS, A CORPORATION OF DELAWARE.

ADJUSTABLE END THRUST FOR ELEVATOR SHAFTS.

Application filed December 1, 1924. Serial No. 753,406.

*To all whom it may concern:*

Be it known that I, DAVID F. MINNEY, a citizen of the United States, residing at Fort Worth, in the county of Tarrant and State of Texas, have invented certain new and useful Improvements in Adjustable End Thrusts for Elevator Shafts, of which the following is a specification.

My invention relates to thrust bearings and more particularly to thrust bearings in combination with the brake wheel shafts of elevators; and the object is to provide simple devices for taking up the slack of or wear on the shoulders of the worm wheel shafts and also the wear on the teeth of the drum and neutral gear wheels. One of the objects is to save time and expense of dismantling the machinery by providing devices by which the wear can be taken up instantly without disturbing or taking down the head. Other objects and advantages will be fully explained in the following description and the invention will be more particularly pointed out in the claims.

Reference is had to the accompanying drawings which form a part of this application.

Fig. 1 is a longitudinal section of a portion of the gear casing, showing the worm pinion and portions of the neutral and drum gear wheels. Fig. 2 is a longitudinal section of the spool or thrust member and the driving head. Fig. 3 is an interior end elevation of the device, as shown in Fig. 2. Fig. 4 is an exterior end elevation of the device, as shown in Fig. 2. Fig. 5 is an end elevation of the bronze bearing disk.

Similar characters of reference are used to indicate the same parts throughout the several views.

The gear case and the worm gearing are shown in part in the drawings. The drum gear 1 and the neutral gear 2 are shown in the gear casing 3 together with the worm pinion 4 with its shaft 5. The shaft 5 has sockets for dowel pins 6 which are carried by the thrust member 7. The thrust member 7 has a head 8 and a socket in the end for a bronze bushing 9 which is mounted in this socket. The bushing 9 is rigid with the thrust member 7 and loose on the spindle or shaft 10 on which the thrust member is supported and runs. The end thrust fixtures are supported generally by a head 11 which is bolted to the gear casing 3 by stud bolts 12 by screwing the bolts 12 into the casing and then mounting the head 11 thereon and then securing the same with the nuts 13. The driving members include the screw shaft 14 and a steel disk 15. The disk 15 is non-revoluble and is prevented from revolving by studs 16 which project into sockets 17 in the head 11. A bronze disk 18 is mounted between the driving disk 15 and the end of the thrust member 7 to prevent friction of the steel disk 15 and the end of the thrust member 7. The head or flange 8 on the thrust member 7 provides additional surface for exerting pressure, that is, it provides greater surface for the disks 15 and 18 to press against when driven by the screw shaft 14. The space 19 within the head 11 and about the thrust member 7 and flange 8 and disks 15 and 18 constitutes a reservoir for a lubricant. The lubricant is prevented from escaping about the member 7 by a disk 20 which carries a felt washer 21. The disk 20 is held in place by the gear casing 3 and the head 11, being caught at its rim between portions of the head 11 and the gear casing 3.

After the screw shaft 14 has been positioned, it is held in place by a nut 22 and a lock wrench 23. The screw shaft 14 is screwed in until the shoulder 24 has pressed the disks 15 and 18 snugly against the head 8 of the thrust member 7. The wrench lock 23 is then placed about the screw shaft 14 and secured by one of the stud screws 12 and its nut 13. When the teeth on the drum gear wheel 1 and neutral gear wheel 2 and the worm threads 4 on shaft 5 become worn, the mechanism will begin to hammer and knock and the thrust member 7 will become loose. The trouble will be remedied by removing the nut 22 and then turning the screw shaft 14 to drive forward the disk 15 until the wear is taken up. The nut 22 is then replaced. The bronze bearing 18 and the thrust member 7 will be driven inwardly to move the shaft 5 to adjust the teeth 4.

The bronze bearing 18 is lubricated on opposite sides by curved grooves 25. The lubricant from the reservoir 19 will penetrate the grooves 25 and thus keep the bearing 18 lubricated to prevent friction against the disk 15 and the head 8 of the driving member 7. The screw shaft 14 has flat sides 26 to be engaged by the wrench lock 23. The wrench lock 23 can be secured by any one of the bolts 12.

What I claim, is,—

1. The combination with an elevator shaft and bearings therefor, of an end thrust for adjusting said shaft consisting of a thrust drive member having a head and operatively connected with said shaft and provided with a socket therein, a bearing housing operatively connected to the bearing of said shaft, a non-revoluble steel driving disk operatively connected to said housing and an antifriction bearing disk interposed between said steel disk and said head, a screw driving member operating through said housing for adjusting said thrust member and provided with a reduced end portion projected into said thrust member and constituting a bearing therefor and having a shoulder bearing against said steel disk, and means for preventing the turning of said screw driving member after it has been positioned.

2. The combination with an elevator shaft and casing therefor of an end thrust consisting of a thrust drive member having a head and operatively connected with said shaft and provided with a socket therein, a bearing housing rigidly connected to said casing, a bronze bearing in said socket, a driving disk non-revolubly connected to said housing, a bronze bearing disk interposed between said driving disk and said head, a screw driving member operating through said housing for adjusting said thrust drive member and provided with a reduced end portion projected into said bronze bearing, and means for locking said screw driving member against turning after it is installed.

3. The combination with an elevator shaft and casing therefor of an end thrust consisting of a thrust drive member having a head and operatively connected with said shaft and provided with a socket therein, a bronze bearing in said socket, a bearing housing rigidly connected to said casing and provided with a screw-threaded opening therethrough, a steel driving disk loosely but non-revolubly connected to said housing, a bronze bearing disk interposed between said steel disk and said head and provided with lubricating ducts in the faces thereof, said bearing housing constituting a lubricant reservoir, a screw driving member operating through said housing and having a bearing member projected into said bronze bearing, and means for preventing the turning of said screw after it is installed consisting of a wrench lock secured to said housing and a lock nut engaging said screw member.

In testimony whereof, I set my hand, this 26th day of November, 1924.

DAVID F. MINNEY.